J. ADAIR.
Improvement in Grocers' Cans.

No. 128,837. Patented July 9, 1872.

Witnesses
R. C. Wrenshall
James I. Kay

Inventor
James Adair
by his Attorneys
Bakewell Christy & Kerr

UNITED STATES PATENT OFFICE.

JAMES ADAIR, OF KILBUCK TOWNSHIP, PENNSYLVANIA.

IMPROVEMENT IN GROCERS' CANS.

Specification forming part of Letters Patent No. 128,837, dated July 9, 1872.

SPECIFICATION.

*To all whom it may concern:*

Be it known that I, JAMES ADAIR, of Kilbuck township, in the county of Allegheny and State of Pennsylvania, have invented a new and useful Improvement in Grocers' Cans; and I do hereby declare the following to be a full, clear, and exact description thereof, reference being had to the accompanying drawing forming part of this specification, in which—

Figure 1:
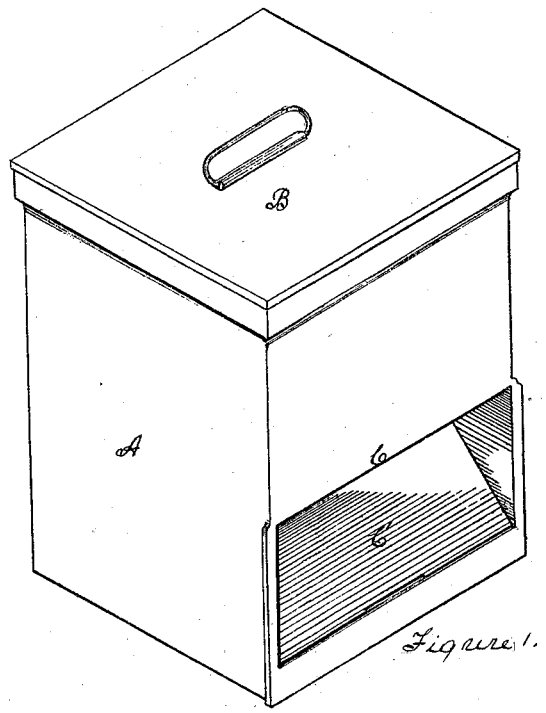
Figure 2:
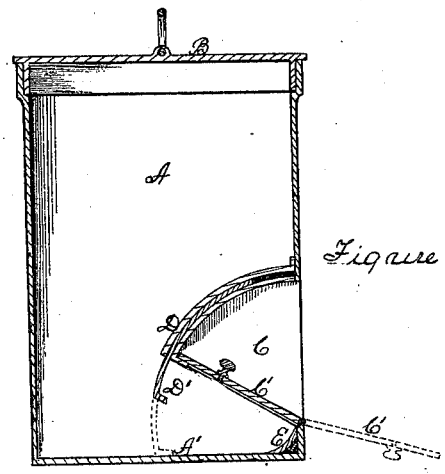

Figure 1 is a perspective view of the can, and Fig. 2 is a vertical cross-section thereof.

Like letters of reference indicate like parts of each.

My invention relates to an improvement in cans, boxes, or vessels more particularly designed for grocers' use, though adapted for use for many purposes outside of a grocer's trade. It consists of a can, box, or case made of suitable size and material, provided with a door, lid, or other aperture at or near the upper end, for filling; also one in the side at or near the lower end, over which, and projecting inward, part way across, is a ledge, which may be straight or curved, at pleasure. I also make the ledge adjustable in length, like a sliding gate, and close the lower aperture by a door.

To enable others skilled in the art to make and use my improvement, I will proceed to explain the construction and operation of the same with more particular reference to its use as a tea-canister.

A is a can, box, or case, closed at the top by a lid or cover, B, through which it may be filled or the supply replenished from time to time.

Tea-canisters as now generally made consist of a can and lid, and the tea is both filled in and removed at the top. The frequent removal of the lid permits the escape of the aroma of the tea, and the lower contents, being seldom removed, become deteriorated, if not spoiled, from long exposure. Also, the frequent insertion of a scoop into the tea at the top breaks the tea-leaves and increases the waste of tea-dust. I obviate all these difficulties by only filling at the top, (and for this purpose the top may extend through the floor above,) keeping the top tightly closed except when filling or replenishing, and then supplying customers from the bottom.

To do this I make an opening, C, in the side of the canister A, at or near the bottom, and close this opening by a hinged or removable door, C'. Projecting inwardly from above the door is a ledge, D, which may be made straight or curved, as shown, this ledge projecting inwardly such distance, and its inner end being such distance from the bottom, that the contents of the canister will not, by their own natural flow, escape at the door when the latter is open. And these distances may be regulated so as to adapt the canister for use with teas of different-sized leaves, or with coffee or other small-grained or small-sized contents, by means of a slide, D', which, like a sliding gate, shall play in or on the fixed ledge D. The ledge then being adjustable as to its length, the size or (if the ledge be horizontal) the position of the orifice A' may be varied at pleasure.

For convenience in supplying customers, an incline or concave, E, may extend from the lower edge of the opening C (if it be above the bottom) back to the bottom at any desired point. The particular object of this incline is that the scoop may the more readily pass under instead of through the tea or other contents.

The canister, box, or case described may be applied to other than grocers' purposes with manifest advantage. Various small-sized or small-grained articles of sale or household use may be stored in it, and removed from it as wanted, and its application to such and kindred uses I include in the purposes of its construction.

What I claim as my invention, and desire to secure by Letters Patent, is—

A can or case having an aperture for filling or replenishing at or near the top, an opening for removing the contents at or near the lower end; when combined with a sliding or adjustable ledge, D', and an inclined floor or bottom, E, substantially as set forth.

In testimony whereof I, the said JAMES ADAIR, have hereunto set my hand.

JAMES ADAIR.

Witnesses:
A. S. NICHOLSON,
JAMES I. KAY.